Dec. 14, 1926.
S. A. STAEGE
1,610,628
SPEED REGULATOR SYSTEM
Filed Feb. 14, 1921
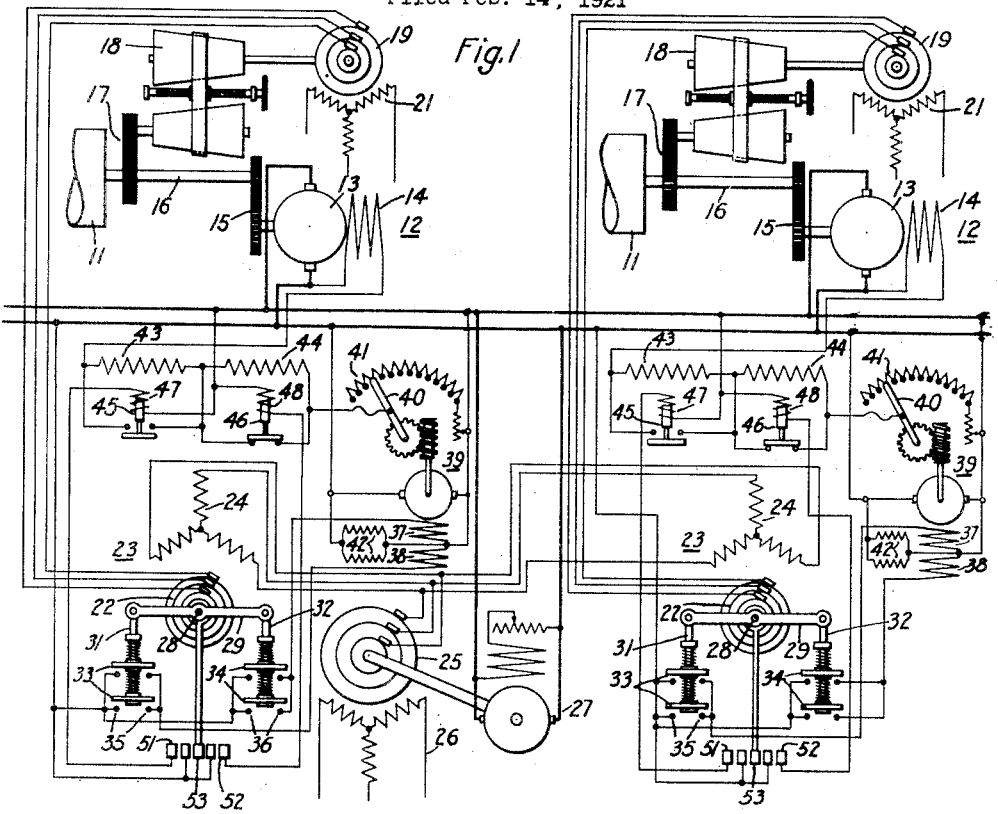
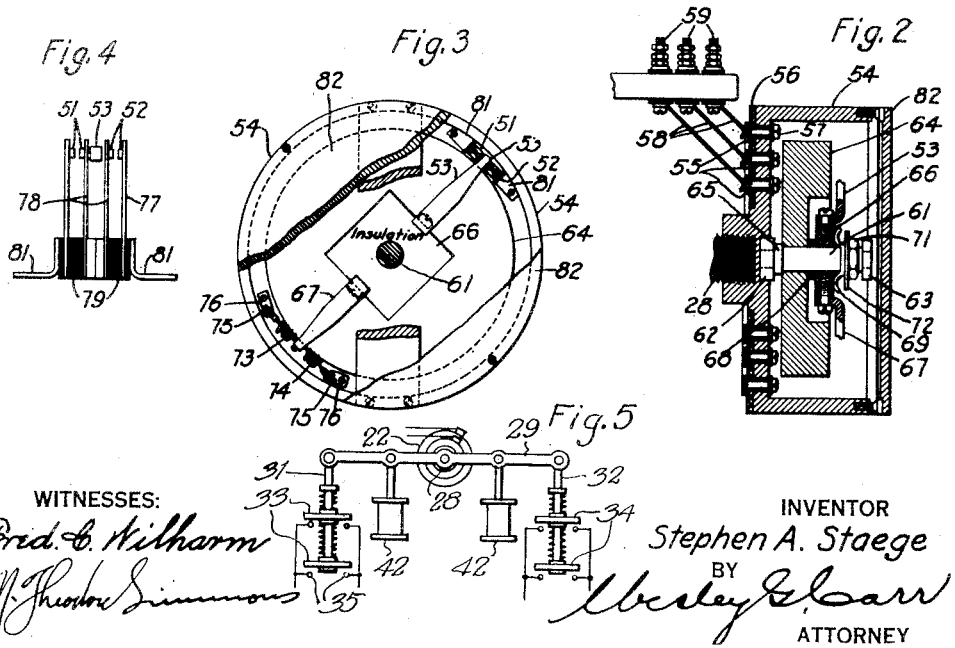
WITNESSES:
Fred C. Wilharm
M. Theodore Simmons
INVENTOR
Stephen A. Staege
BY
Wesley G. Carr
ATTORNEY Patented Dec. 14, 1926.

1,610,628

UNITED STATES PATENT OFFICE.

STEPHEN A. STAEGE, OF PITTSBURGH, PENNSYLVANIA, ASSIGNOR TO WESTINGHOUSE ELECTRIC & MANUFACTURING COMPANY, A CORPORATION OF PENNSYLVANIA.

SPEED-REGULATOR SYSTEM.

Application filed February 14, 1921. Serial No. 444,908.

My invention relates to speed-regulator systems, and has special relation to systems adapted to maintain a substantially constant-speed ratio between a plurality of moving members.

One object of my invention is to provide a speed-regulator system of the above-indicated character which shall be simple and efficient in operation and free from hunting action, at the same time permitting adjustment of the speed of either the individual members or all the members, as a group.

In my copending application, Serial No. 444,906, filed February 14, 1921, is described a speed-regulator system of the above-indicated character wherein each set of rotatable members is propelled by a variable-speed motor. Each rotatable member operates a speed-changing device which, in turn, operates a frequency changer that is electrically connected to one winding of an electric differential. The other winding of the electric differential is connected to a frequency changer which is common to all of the rotatable members and is adapted to supply a constant frequency. Any difference in frequency occurring between the common frequency changer and the individual frequency changer that is driven by the rotatable member will be recorded by a corresponding movement of the electric differential to set in motion a train of mechanism that is adapted to correct the propelling-motor speed in accordance with the abnormal load thereupon. The mechanism mentioned includes a rheostat motor in the shunt field-magnet-winding circuit of the propelling motor.

The anti-hunting apparatus therein comprises an inertia-responsive device which also serves as an accelerator for the corrective mechanism.

In the present application, the shunt field-magnet-winding circuit of the propelling motor includes, in addition to a motor-operated rheostat, two additional resistors. The insertion of these resistors is controlled by electro-magnets, the operating coils of which are controlled by the inertia-responsive device referred to above.

The purpose of this apparatus is to temporarily over or under-excite the shunt field-magnet winding of the propelling motor in case of a sudden, large change in load upon the propelling motor to more quickly effect the necessary correction. In other words, in the event of a sudden change in load upon the main motor, the inertia-responsive device immediately compensates for the load variation to maintain the speed of the main motor substantially constant, while the rheostat pilot motor is picking up, to thereby properly and more or less permanently regulate the strength of the main motor.

Reference may now be had to the accompanying drawing, wherein—

Fig. 1 is a diagrammatic illustration of circuits and apparatus embodying my invention, as applied to a plurality of rotatable members; and Figs. 2, 3 and 4 are different detailed views of the inertia-responsive apparatus, parts being broken away to facilitate the illustration.

Fig. 5 is a detail view illustrating the connection between the coils 42 and the lever 29.

Referring to the drawing, the present invention will be described with reference to a single set of rotatable rolls, and, inasmuch as the apparatus for each roll unit is similar, the illustrated duplicated parts will be given the same reference numerals.

A roll 11 is driven by a main propelling motor 12, having an armature 13 and a shunt field-magnet winding 14, through suitable gearing 15, which is mounted upon the shaft 16 of the roll 11. Also mounted upon the shaft 16 is gearing 17 which operates a speed-changing device 18 of the cone-pulley type. The speed-changing device, in turn, drives the rotor 19 of a frequency changer, the primary winding 21 of which is energized from any suitable source of power.

The rotor 19 is electrically connected to the rotor 22 of an auxiliary frequency changer or electric differential 23. The primary winding 24 of frequency changer 23 is electrically connected to the secondary winding 25 of a frequency changer 26 which is common to all of the roll units. The rotor 25 is driven from a motor 27, in any suitable or well-known manner, to supply a constant frequency to the various auxiliary frequency changers. Accordingly, any variations in frequency between the primary winding 24 and the secondary winding 22 will be indicated by the rotation of the shaft 28 of frequency changer 23.

Mounted upon the shaft 28 is a double-acting lever 29 which moves in accordance with the rotation of the shaft 28. The movements of the lever 29 operate contact arms 31 and 32, respectively carrying contactors 33 and 34 which, in turn, bridge terminals 35 and 36.

Terminals 35 and 36 are respectively in circuit with differential field-magnet windings 37 and 38 of the pilot motor 39 which operates the arm 40 of the rheostat 41 in any suitable manner. Rheostat 41 is located in circuit with the shunt field-magnet winding 14 of the main motor 12.

Connected in parallel relation across the armature of the pilot motor 39, are the actuating coils 42 of two electromagnetic switches. The coils 42 correspond to coils 110 and 116, illustrated and described in my copending application, Serial No. 350,846, filed Jan. 12, 1920, and the mode of operation thereof is the same. Briefly, the operation may be stated to be the normal step-by-step movement of rheostat arm 40.

Hence, should the roll 11 speed up, for example, by reason of a decrease in the load thereupon, the frequency changer 19 will be driven at an increased speed, to apply an increased frequency to the secondary winding 22 of the electric differential 23. Thus, the shaft 28 of frequency changer 23 will be rotated in a counter-clockwise direction, whereupon contactors 33, carried by arm 29, will engage terminals 35 to energize field-magnet winding 38 of the rheostat motor 39 to move the rheostat arm 40 in the proper direction to weaken the field 14 of propelling motor 12 and reduce the speed thereof. As referred to above, the effect of the electromagnet coils 42 will be to cause a step-by-step operation of the rheostat arm 40. This action affords a comparatively slow correction of the speed of the motor 12 in the event of a sudden and large change in the load upon the main motor 12. Such a large change requires an equally quick and large correction of the propelling-motor speed to prevent material damage either to product or apparatus.

Accordingly, to acquire the desired quick compensation for sub-variations in load upon the main motor 12 to maintain the speed thereof substantially constant, the following apparatus is provided:—

Two resistor sections 43 and 44 are inserted in the circuit of the shunt field-magnet winding 14 of the motor 12. The insertion in, and exclusion of, these resistor sections from this circuit is controlled by means of electromagnetic switches 45 and 46, respectively. In the present illustration, resistor 43 is shown as normally included in the circuit of the field-magnet winding 14. Hence, electromagnetic switch 45 is normally open. On the other hand, resistor 44 is illustrated as normally excluded from the shunt field-magnet winding circuit, and, hence, switch 46 is normally closed to close a shunt path around resistor 44.

The operating coils 47 and 48, respectively, of switches 45 and 46 are connected to opposite sets of switch terminals 51 and 52. Projecting between the terminals 51 and 52 is a contact arm 53 which is frictionally mounted upon the shaft 28, as will be more particularly described with reference to Figs. 2 and 3, the illustration in Fig. 1 of the arm 53 being merely diagrammatic of the mechanism of Figs. 2, 3 and 4.

A casing 54 is screwed upon the end of the shaft 28. On the rear face thereof are mounted three collector rings 55, which are separated from the casing 54 by means of insulating material 56. The rings 55 are secured to the casing 54 in any suitable manner, as by the illustrated screws 57. Co-operating with the collector rings 55 are three brushes 58. To the binding posts 59 therefor are brought the circuit connections from the electromagnetic coils 47 and 48.

On the interior of the casing 54 a shaft 61 is mounted in appropriate bearings 62 and 63. The shaft 61 carries a fly wheel 64 which is separated from the casing 54 by means of a washer 65, so that the fly-wheel maintains a frictional engagement with the casing 54.

Also mounted upon the shaft 61 is a block of insulating material 66, to one side of which is secured the contact arm 53, and to the opposite side of which is secured a holding or centering arm 67. A washer 68 separates the fly-wheel 64 from the insulation block 66. A frictional engagement between the fly-wheel 64 and the block 66 is maintained by a spring 69 which bears directly against the block 66. The tension of spring 69 may be regulated by adjustment of a nut 71 which bears against a washer 72.

The arm 53 is maintained in a neutral position between the sets of terminals 51 and 52 by means of springs 73 and 74 on opposite sides, respectively, of the holding arm 67. The free ends of springs 73 and 74 are secured to bolts 75, which are adjustable in the brackets 76 to thereby regulate the tension of the springs 73 and 74.

As best shown in Fig. 4, the sets of terminals 51 and 52 are respectively mounted upon resilient arms 77 and 78 that are secured in blocks of insulating material 79 which, in turn are secured to the casing 54 by means of brackets 81. Appropriate connections are taken from arms 77 and 78 to the screws 57 of the collector rings 55 to thereby connect the terminals 51 and 52 to the coils 47 and 49, as diagrammatically shown in Fig. 1.

The casing 54 is rendered dust-proof by means of a cap 82, which is secured thereto in any convenient manner.

It will be apparent, from the foregoing description, that the movements of the shaft 28 of the auxiliary frequency changer will be conveyed to the casing 54. If the change in frequency should be slight or gradual, the fly-wheel would rotate with the housing 54 by reason of the frictional engagement therebetween. Here, the necessary correction will be obtained through rheostat 41.

However, if the shaft 28 is given a sudden or large turning movement in either direction, the inertia of the fly-wheel 64 will prevent it from immediately acquiring the rotational speed of the casing 54, which turns with the shaft 28. Hence, if the movement is sufficiently large, the arm 53 will engage one of the sets of terminals 51 and 52, depending upon the direction of rotation. From the electrical connections illustrated in Fig. 1, it will be apparent that one of the operating coils 47 and 48 will be energized to thereby operate switch 45 or switch 46, depending upon whether it is desired to insert resistance in or remove resistance from the shunt field-magnet-winding circuit.

Thus, for example, should there be a large increase in the load upon the rolls 11, thereby permitting the speed of the motor 12 to correspondingly decrease, the shaft 28 will be rotated at a rapid rate. The inertia of the fly-wheel 64 will cause arm 53 to close switch terminals 52, thereby energizing coil 48 of switch 46, causing it to open. This action will insert resistor 44 in the circuit of field-magnet winding 14, in addition to resistor 43, which is normally maintained in the circuit, to at once under-excite the field of motor 12, thus increasing its speed quickly. This condition will be maintained until the desired correction has been made. Meanwhile, the pilot motor 39 has been moving arm 40 along rheostat 41 in order to effect the more or less permanent correction of the strength of field 14, through the action of lever 29, as described above. This operation is desirable, for the reason that, in rolling mills, changes of load frequently extend over considerable periods of time.

As the housing 54 continues to rotate, the fly-wheel 64 will eventually obtain the same rotational speed as the casing 54, and hence, the arm 53 will again occupy a central position with respect to the contact members 51 and 52. Thus, the circuit of the energized coil 48 will be broken to thereby restore the apparatus to its normal operating condition.

Hunting action of the motor will be prevented by reason of the fact that such return of the arm 53 to its neutral position will occur at a time just prior to the obtaining of normal load conditions on the motor 12, but the momentum of the moving parts of the apparatus will be sufficient to continue the correction until the normal speed is obtained. Hence, there will be no overtravel of the motor 12 or any of the parts of the regulator.

Likewise, the frictional engagement of the fly-wheel with the housing and the tension of the springs 73 and 74 upon the holding arm 67 will, under normal conditions, be sufficient to prevent the arm 53 from closing the opposite set of terminals to initiate a counter-movement to the correction nearing completion. This will be true, except where such an operation is desirable, in which event the inertia of the fly-wheel will again force the closing of the opposite set of terminals to cause a reversal of the operation above described, and to energize coil 47 to close switch 45 and exclude resistor 43 from the circuit of field-magnet winding 14.

In the foregoing specification there has been described a method for compensating for gradual and slight changes in load upon the propelling motor 12, and also a method to quickly compensate for large and sudden changes in load upon the motor 12.

Modifications in the system and in the arrangement and location of parts may be made within the spirit and scope of my invention, and such modifications are intended to be covered by the appended claims.

I claim as my invention:—

1. In a regulator system, the combination with a plurality of rotatable members, a plurality of dynamo-electric machines, and a dynamo-electric machine common to all rotatable members, of means jointly controlled by said dynamo-electric machines for governing the speed of each rotatable member within a predetermined range, and inertia-responsive means for directly governing the speed of each rotatable member for other speed ranges.

2. In a regulator system, the combination with a plurality of rotatable members, a plurality of dynamo-electric machines, and a dynamo-electric machine common to all rotatable members, of means jointly controlled by said dynamo-electric machines for governing the speed of each rotatable member within a predetermined range, and inertia-responsive means for directly governing the speed of each rotatable member for other speed ranges, such means also constituting an anti-hunting device for said system.

3. In a regulator system, the combination with a plurality of rotatable members, a propelling motor for each of said members, means comprising a plurality of dynamo-electric machines, and a common dynamo-electric machine for controlling the propelling motors to operate the rotatable members at a constant-speed ratio under predetermined conditions, of inertia-responsive means for directly controlling said speed under other conditions.

4. In a speed-regulator system, the combination with a plurality of rolls, a propelling motor for each of said rolls, and an electric differential associated therewith, of means co-operating with said electric differential comprising a contact-carrying device adapted to correct the speed of the associated propelling motor under certain conditions, a fly-wheel also responsive to variation in the operation of said electric differential, and switch mechanism operated by said fly-wheel and adapted to be so operated as to directly regulate said motor.

5. In a regulator system, the combination with a plurality of dynamo-electric machines and a constant-speed machine, of control means jointly governed by said machines, and additional control means co-operating with and adapted to supersede the action of said first-mentioned control means under predetermined conditions.

6. In a regulator system, the combination with a rotatable member, a propelling motor for said rotatable member having an armature and a field-magnet winding, and means comprising a motor-operated rheostat in circuit with said field winding, normally having a step-by-step operation for controlling the propelling motor, of means for automatically temporarily over or under, exciting the field-magnet winding of the propelling motor.

7. In a speed-regulator system, the combination with a plurality of rotatable members, a propelling motor for each of said members, a plurality of frequency changers co-operating therewith, a frequency changer common to all of said rotatable members, a motor-operated rheostat associated with each of said propelling motors and jointly controlled by the common frequency changer and the associated frequency changer, said rheostat normally governing the excitation of the associated propelling motor, of inertia-responsive means adapted to temporarily govern the excitation of the propelling motor.

8. In a speed-regulator system, the combination with a plurality of rotatable members, motors for rotating said members, and a frequency changer common to all rotatable members, of a frequency changer associated with each rotatable member, means controlled by said frequency changer and by said common frequency changer for normally governing the speed of the propelling motor, and inertia-responsive means for temporarily governing the speed of the propelling motor under predetermined conditions.

9. In a speed-regulator system, the combination with a motor, a contact arm connected to the rotor of said motor and carrying contact members operated in accordance with the forward or reverse movement of said rotor, and a rheostat motor having differentially related field-magnet windings respectively controlled by said contact members to control said motor, of means responsive to inertia action and associated with said motor to directly control said motor under predetermined conditions.

10. In a control system, the combination with a motor to be controlled, and a motor-operated rheostat in circuit therewith and adapted to automatically vary the motor speed, of additional resistors in circuit with said motor, electroresponsive means for controlling the resistors and means for selectively energizing said electroresponsive means.

11. In a regulator system, the combination with a plurality of rotatable members, and a propelling motor for each of said members, of means comprising a plurality of auxiliary members adapted to operate at a constant-speed ratio for controlling said propelling motors to maintain a constant-speed ratio between said rotatable members, including a rheostat in circuit with said propelling motor, and means also in circuit with said propelling motor for quickly compensating for sudden variations in load upon said motor.

12. In a regulator system, the combination with a motor, means in circuit therewith for maintaining the speed thereof substantially constant, and electroresponsive control means therefor, of a contact-carrying device associated therewith, a contact device carried thereby, a fly-wheel responsive to variations in the speed of said motor, and an arm engaged by said fly-wheel and adapted to engage said contact device to control the energization of said electroresponsive means.

13. In a regulator system, the combination with a propelling motor and means comprising a plurality of auxiliary members for controlling said propelling motors and control means therefor, of accelerating mechanism for said system comprising resistors in circuit with said motor, a contact device actuated by said control means, a fly-wheel responsive to the movements of said control means, and an arm engaged by said fly-wheel and adapted to engage said contact device.

14. In a regulator system, an electric differential, regulating means normally controlled in accordance with the operation of said differential, and additional regulating means also operated by said differential comprising a casing connected to said differential, switch terminals carried by said casing, a fly-wheel loosely mounted in said casing, a contact arm frictionally engaged by said fly-wheel, said arm engaging different terminals under predetermined conditions, and means for normally maintaining said contact arms out of engagement with said terminals.

15. In a regulator system, an electric differential, regulating means normally controlled in accordance with the operation of said differential, and additional regulating means also controlled by said differential for superseding the action of the first-mentioned regulating means.

16. In a regulator system, the combination with a motor, a constant-speed source, an electric differential therebetween, regulating means controlled in accordance with the operation of said differential, and other regulating means for directly controlling said motor under predetermined conditions.

In testimony whereof, I have hereunto subscribed my name this 5th day of February, 1921.

STEPHEN A. STAEGE.